(12) United States Patent
Schiller et al.

(10) Patent No.: US 10,065,588 B2
(45) Date of Patent: Sep. 4, 2018

(54) CRASH BOX

(71) Applicant: BENTELER AUTOMOBILTECHNIK GMBH, Paderborn (DE)

(72) Inventors: Andreas Schiller, Lippstadt (DE); Christian Handing, Langenberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/284,722

(22) Filed: Oct. 4, 2016

(65) Prior Publication Data

US 2017/0106824 A1 Apr. 20, 2017

(30) Foreign Application Priority Data

Oct. 6, 2015 (DE) .................. 10 2015 117 005

(51) Int. Cl.
| | |
|---|---|
| B60R 19/34 | (2006.01) |
| B62D 21/02 | (2006.01) |
| B62D 21/15 | (2006.01) |
| B62D 29/00 | (2006.01) |
| F16F 7/00 | (2006.01) |
| F16F 7/12 | (2006.01) |
| B60R 19/24 | (2006.01) |

(52) U.S. Cl.
CPC .............. B60R 19/34 (2013.01); B62D 21/02 (2013.01); B62D 21/152 (2013.01); B62D 29/008 (2013.01); F16F 7/003 (2013.01); F16F 7/121 (2013.01); B60R 2019/247 (2013.01)

(58) Field of Classification Search
CPC . B60R 19/34; B60R 19/00; B60R 2019/1866; B29C 66/7212; F16F 7/12; B62D 21/152; B62D 25/082; B60K 1/04
USPC ................ 293/133, 132; 296/187.09, 203.02
See application file for complete search history.

(56) References Cited

U.S. PATENT DOCUMENTS

| | | | | |
|---|---|---|---|---|
| 5,407,239 A | * | 4/1995 | Arai ........................ | B60R 19/18 293/102 |
| 5,727,826 A | * | 3/1998 | Frank ...................... | B60J 5/042 293/102 |
| 5,772,267 A | * | 6/1998 | Heim ...................... | B60R 19/34 293/132 |
| 6,003,930 A | * | 12/1999 | Frank ...................... | F16F 7/12 293/132 |
| 6,102,470 A | * | 8/2000 | Heim ...................... | B60J 5/101 293/133 |

(Continued)

FOREIGN PATENT DOCUMENTS

| | | |
|---|---|---|
| DE | 40 09 401 A1 | 9/1991 |
| DE | 195 17 919 A1 | 11/1996 |

(Continued)

Primary Examiner — Kiran B Patel
(74) Attorney, Agent, or Firm — Sheridan Ross P.C.

(57) ABSTRACT

The invention relates to a crash box having a plurality of hollow chambers which extend over the longitudinal extent of the crash box, a first hollow chamber being arranged offset in terms of height with respect to a second hollow chamber and a third hollow chamber in the mounted position. Here, the first hollow chamber is separated by means of a dividing wall from the second and third hollow chambers which are preferably arranged next to one another above or below the first hollow chamber.

17 Claims, 2 Drawing Sheets

(56) References Cited

U.S. PATENT DOCUMENTS

| | | | | |
|---|---|---|---|---|
| 6,481,690 B2* | 11/2002 | Kariatsumari | B60R 19/18 | 293/102 |
| 6,746,061 B1* | 6/2004 | Evans | B60R 19/18 | 293/120 |
| 8,052,184 B2* | 11/2011 | Braunbeck | B60R 19/34 | 293/132 |
| 8,353,545 B1* | 1/2013 | Baldwin | B60R 19/34 | 188/374 |
| 8,438,808 B2* | 5/2013 | Carlson | B29C 47/021 | 264/173.17 |
| 8,939,480 B1* | 1/2015 | Barbat | B60R 19/34 | 293/133 |
| 9,045,100 B2* | 6/2015 | Kaneko | B60R 19/34 | |
| 9,187,127 B2* | 11/2015 | Tyan | B62D 21/152 | |
| 9,199,592 B1* | 12/2015 | Nusier | B60R 19/34 | |
| 9,327,665 B2* | 5/2016 | Barbat | B60R 19/34 | |
| 9,469,265 B2* | 10/2016 | Kamiya | B60R 19/34 | |
| 9,616,833 B2* | 4/2017 | Lee | B60R 19/34 | |
| 9,623,822 B2* | 4/2017 | Lee | B60R 19/34 | |
| 9,630,582 B1* | 4/2017 | Faruque | B33Y 10/00 | |
| 9,725,057 B2* | 8/2017 | Lee | B60R 19/34 | |
| 9,764,705 B2* | 9/2017 | Murata | B60R 19/34 | |
| 9,789,906 B1* | 10/2017 | Tyan | B60R 19/34 | |
| 9,828,032 B2* | 11/2017 | Watanabe | B62D 21/152 | |
| 9,840,281 B2* | 12/2017 | Tyan | B62D 21/15 | |
| 9,845,112 B2* | 12/2017 | Tyan | B62D 21/152 | |
| 2002/0063433 A1* | 5/2002 | Gotanda | B60R 19/34 | 293/132 |
| 2002/0079711 A1* | 6/2002 | Kajiwara | B60R 19/18 | 293/133 |
| 2005/0016807 A1* | 1/2005 | Braymand | B62D 29/002 | 188/371 |
| 2005/0062300 A1* | 3/2005 | Toneatti | B60R 19/34 | 293/133 |
| 2005/0104393 A1* | 5/2005 | Haneda | B60R 19/26 | 293/133 |
| 2005/0218672 A1* | 10/2005 | Mustafa | B60R 19/22 | 293/109 |
| 2006/0043744 A1* | 3/2006 | Iketo | B60R 19/34 | 293/132 |
| 2006/0255603 A1* | 11/2006 | Rebuffet | B60R 19/24 | 293/120 |
| 2007/0228747 A1* | 10/2007 | Hodoya | B60R 19/18 | 293/102 |
| 2008/0106107 A1* | 5/2008 | Tan | B60R 19/34 | 293/133 |
| 2008/0217935 A1* | 9/2008 | Braunbeck | B60R 19/34 | 293/132 |
| 2009/0001737 A1* | 1/2009 | Salomonsson | B60R 19/34 | 293/133 |
| 2009/0026777 A1* | 1/2009 | Schmid | B60R 19/34 | 293/133 |
| 2010/0194125 A1* | 8/2010 | Wibbeke | B60R 19/24 | 293/120 |
| 2011/0121587 A1* | 5/2011 | Handing | B60R 19/18 | 293/133 |
| 2011/0193370 A1* | 8/2011 | Klimek | B60R 19/34 | 296/187.09 |
| 2011/0193371 A1* | 8/2011 | Klimek | B60R 19/34 | 296/187.09 |
| 2011/0254294 A1* | 10/2011 | Handing | B60R 19/18 | 293/102 |
| 2011/0316307 A1* | 12/2011 | Di Modugno | B60R 19/34 | 296/187.03 |
| 2012/0098280 A1* | 4/2012 | Handing | B60R 19/34 | 293/118 |
| 2012/0112479 A1* | 5/2012 | Nagwanshi | B60R 19/34 | 293/133 |
| 2012/0139273 A1* | 6/2012 | Jeong | B60R 19/34 | 293/132 |
| 2012/0146348 A1* | 6/2012 | Di Modugno | B60R 19/34 | 293/133 |
| 2013/0001964 A1* | 1/2013 | Freundl | B60R 19/18 | 293/133 |
| 2013/0106123 A1* | 5/2013 | Carlson | B62D 27/02 | 293/155 |
| 2013/0119705 A1* | 5/2013 | Matuschek | B62D 21/152 | 296/187.03 |
| 2013/0127191 A1* | 5/2013 | Zannier | B60R 19/03 | 293/133 |
| 2013/0193699 A1* | 8/2013 | Zannier | B60R 19/34 | 293/133 |
| 2014/0034435 A1* | 2/2014 | Kondo | B60R 19/34 | 188/377 |
| 2014/0203577 A1* | 7/2014 | Nagwanshi | B60R 19/34 | 293/120 |
| 2014/0292007 A1* | 10/2014 | Kawamata | B60R 19/34 | 293/133 |
| 2014/0319860 A1* | 10/2014 | Braunbeck | B60R 19/34 | 293/133 |
| 2014/0367984 A1* | 12/2014 | Blumel | B60R 19/34 | 293/132 |
| 2015/0001866 A1* | 1/2015 | Noyori | B60R 19/34 | 293/133 |
| 2015/0021940 A1* | 1/2015 | Roselli | B60R 19/34 | 293/133 |
| 2015/0197206 A1* | 7/2015 | Tamura | B60R 19/34 | 293/133 |
| 2015/0232050 A1* | 8/2015 | Yamada | B60R 19/34 | 296/187.1 |
| 2015/0343972 A1* | 12/2015 | Lee | B60R 19/34 | 293/133 |
| 2016/0001722 A1* | 1/2016 | Nickel | B60R 19/18 | 293/120 |
| 2016/0001725 A1* | 1/2016 | Nakanishi | B60R 19/34 | 293/133 |
| 2016/0121829 A1* | 5/2016 | Murata | B60R 19/34 | 293/133 |
| 2016/0221521 A1* | 8/2016 | Nishimura | B62D 21/15 | |
| 2016/0288750 A1* | 10/2016 | Nickel | B60R 19/483 | |
| 2016/0304044 A1* | 10/2016 | Kutscher | B60R 19/34 | |
| 2017/0021868 A1* | 1/2017 | Watanabe | B62D 21/152 | |
| 2017/0080884 A1* | 3/2017 | Kitakata | B60R 19/03 | |
| 2017/0106429 A1* | 4/2017 | Nakanishi | B21D 47/02 | |
| 2017/0106822 A1* | 4/2017 | Steinebach | B60R 19/03 | |
| 2017/0129429 A1* | 5/2017 | Handing | B60R 19/18 | |
| 2017/0136970 A1* | 5/2017 | Steinebach | B60R 19/34 | |
| 2017/0240128 A1* | 8/2017 | Kashiwagi | B60R 11/00 | |
| 2017/0320455 A1* | 11/2017 | Nakayama | B60R 19/34 | |

FOREIGN PATENT DOCUMENTS

| | | |
|---|---|---|
| DE | 197 09 171 C1 | 6/1998 |
| DE | 197 16 223 C1 | 11/1998 |
| DE | 199 04 630 B4 | 8/2000 |
| DE | 10 2008 036 027 A1 | 4/2009 |
| DE | 10 2008 060 715 A1 | 8/2009 |

* cited by examiner

CRASH BOX

CROSS-REFERENCE TO RELATED APPLICATIONS

This application claims the benefit of German Patent Application No. DE 10 2015 117 005.1 filed Oct. 6, 2015, the entire contents of which are incorporated herein by reference.

FIELD

The invention relates to a crash box in accordance with the preamble of patent claim 1.

BACKGROUND

Bumpers or crossmembers are fastened to a vehicle by way of crash boxes of this type. Here, the crash boxes serve to compensate for the energy which is input into the vehicle in the case of an impact, by said energy being converted for the great part into deformation energy during the deformation of the crash boxes.

For example, EP 0 705 994 A2, U.S. Pat. No. 6,258,465 B1, DE 198 09 112 A1 and FR 2 761 434 A1 have disclosed crash boxes of this type having a plurality of hollow chambers. The crash boxes in said documents have in each case four or more hollow chambers here. In comparison with a single-chamber profile, multiple chamber profiles of this type afford the advantage that a more homogeneous energy level occurs during the deformation with crease formation in the case of a crash, as a result of which the energy absorption structure takes place in the crash box without additional triggering.

Furthermore, JP 2011-57158 A has disclosed a crash box which has three hollow chambers. Here, an inner large hollow chamber is separated by means of a wall from two smaller outer hollow chambers. By way of this, the load is to be compensated for with a greater or earlier introduction of force in the case of a crash in the outer region, with the result that the longitudinal carrier of the motor vehicle, on which the crash box is arranged, is not overloaded and/or deformed. Here, furthermore, an excessive amount of load on the flange plate, by way of which the crash box is fastened to the longitudinal carrier, is also not to be input into the motor vehicle via the center wall there. The arrangement there of the hollow chambers in the crash boxes therefore serves to minimize an inhomogeneous introduction of load into the crash box in the crossmember longitudinal direction perpendicularly with respect to the vehicle direction.

It is, however, not possible by way of the crash boxes which are known from the prior art to compensate for an inhomogeneous introduction of load in the case of a crash if said introduction of load takes place on account of a height offset of the crossmember of the vehicle with respect to the load input. Here, the crossmember would namely rotate about its longitudinal axis perpendicularly with respect to the vehicle longitudinal axis.

SUMMARY

It is therefore an object of the invention to develop a crash box in accordance with the preamble of patent claim 1 in such a way that an inhomogeneous introduction of load into the crash box can be equalized on account of a bumper barrier constellation which is offset in terms of height. Here, a rotation of the crossmember about its longitudinal axis perpendicularly with respect to the vehicle longitudinal axis is to be avoided, and a homogeneous crease formation during the deformation of the crash box in the case of a crash is to be ensured. A rotation of the crossmember arises, above all, in the case of crossmembers which themselves are barely curved or not at all curved and therefore can scarcely make a contribution to the load dissipation in the case of a crash.

Said object is achieved by way of a crash box having all the features of patent claim 1. Advantageous refinements of the invention are found in the subclaims.

Here, the crash box according to the invention having a plurality of hollow chambers which extend over the longitudinal extent of the crash box has precisely three hollow chambers, a first hollow chamber being arranged offset in terms of height with respect to a second hollow chamber and a third hollow chamber in the mounted position of the crash box. In order to ensure a deformation of the crash box here which is as homogeneous and satisfactory as possible, according to the invention the first hollow chamber of the crash box is separated by means of a dividing wall from the two hollow chambers which are preferably arranged next to one another above or below the first hollow chamber and are arranged offset in terms of height with respect to it. Here, the dividing wall is advantageously of continuous configuration and connects an inner side of the crash box which points toward the vehicle center longitudinal axis in the mounted position of the crash box to an outer side of the crash box which points away from the vehicle center longitudinal axis in the mounted position of the crash box.

By way of said configuration according to the invention of the crash box, it is then possible that a deformation with crease formation occurs in a targeted manner in the case of a crash even in the event of an asymmetrical introduction of force. The configuration according to the invention avoids a situation in a targeted manner where the crossmember of the motor vehicle which is arranged on the crash box according to the invention experiences an excessively large rotation about its longitudinal axis perpendicularly with respect to the vehicle center longitudinal axis in the case of a crash. By way of said measure, the crash energy which is introduced into the system is converted substantially into deformation energy within the crash box according to the invention, with the result that no overloading of the longitudinal carrier of the motor vehicle, to which the crash box is fastened, occurs.

Here, the crash box according to the invention can be configured from metal, in particular also a lightweight metal, as an extruded profile. In particular, the extruded profile can consist of aluminum or an aluminum alloy, its yield strength lying between 50 MPa and 200 MPa.

In a first refinement of the invention, the dividing wall which separates the first hollow chamber from the second and third hollow chamber is of continuous configuration and connects an inner side of the crash box to an outer side of the crash box, the dividing wall extending over the entire longitudinal extent of the crash box, with the result that a particularly satisfactory conversion of the energy which is introduced in the case of a crash also takes place by way of this, without an excessive rotation of the crash box occurring. Here, all three hollow chambers also preferably extend substantially over the entire longitudinal extent of the crash box according to the invention, as a result of which the above-described properties which are according to the invention and advantageous are improved further.

In a further refinement of the invention, the two hollow chambers which are arranged offset in terms of height with respect to the first hollow chamber are separated from one another by means of a dividing wall. The dividing wall is preferably also of continuous configuration here. Said dividing wall connects the dividing wall which separates the first hollow chamber from the two hollow chambers which are arranged offset in terms of height with respect to it to an upper side of the crash box. The arrangement of said two dividing walls also serves to convert the crash box according to the invention, in the case of an asymmetrical input of force during the case of a crash, into deformation energy within the crash box in a targeted manner, the above-described rotation of a crossmember of the motor vehicle which is connected to the crash box being minimized, in particular.

Here, the cross section of the crash box is advantageously of substantially rectangular configuration perpendicularly with respect to its longitudinal extent. With the aid of said configuration according to the invention, it is then possible, in the case of a crash, in particular with an asymmetrical load input, to guide the load input in a targeted manner into the region of the underside of the crash box, in particular into the outer wall in the region of the lower hollow chamber.

Furthermore, it has proven advantageous here that the two upper hollow chambers are arranged substantially mirror-symmetrically with respect to one another, a center axis of the dividing wall which separates the two upper hollow chambers being configured as a mirror axis. It is possible as a result of said symmetry to arrange crash boxes according to the invention in both outer regions, with the result that different crash boxes do not have to be produced for the respectively right-hand and left-hand vehicle side. To this extent, the outlay during the production of a motor vehicle is also reduced and therefore a production of crash boxes according to the invention which is optimized in terms of ecology and economy is made possible.

In order that the minimization of a rotation of a crossmember which is connected to the crash boxes according to the invention in the event of an asymmetrical load input in the case of a crash is further minimized and can be controlled in a targeted manner, it is also provided that the first hollow chamber is arranged substantially mirror-symmetrically with respect to the two hollow chambers which are arranged offset in terms of height with respect to it, naturally with the exception of the dividing wall which separates said two hollow chambers, a center axis of the dividing wall which separates said two hollow chambers from the first hollow chamber being configured as a mirror axis.

In a particularly advantageous refinement of the invention, an outer wall of the lower hollow chamber is of thicker configuration than the outer wall of the upper hollow chamber and/or of the dividing walls which separate the hollow chambers from one another. Here, as a result of said thicker configuration of the outer wall of the first hollow chamber, that crash box wall with the highest introduction of load is reinforced, satisfactory and targeted crease formation additionally being made possible in the case of a crash as a result of the first hollow chamber with a cross section which is twice as large in comparison with the two hollow chambers which are arranged offset in terms of height with respect to it. This also once again ensures that, by way of said crash box according to the invention, material is introduced in a targeted manner into the region, in which the greatest loading takes place in the event of an asymmetric load input in the case of a crash.

Furthermore, it is advantageous that a connecting flange can be arranged at the first end of the crash box which is directed toward the motor vehicle in order to arrange the crash box on a motor vehicle or a longitudinal carrier of a motor vehicle.

In order that a crossmember can be arranged at the second end of the crash box which is directed toward the crossmember, an attaching section for the crossmember is provided at the second end of the crash box.

Furthermore, the invention also relates to an energy absorption structure for a motor vehicle having a crossmember, on the outer region of which in each case one crash box of the above-described type is arranged.

Furthermore, the invention also relates to a motor vehicle having at least one energy absorption structure of this type and/or having at least two above-described crash boxes.

Further aims, advantages, features and possible applications of the present invention result from the following description of one exemplary embodiment using the drawing. Here, all features which are described and/or shown pictorially form the subject matter of the present invention per se or in any desired appropriate combination, even independently of their summary in the claims or their back-reference.

DETAILED DESCRIPTION

Figure 1:
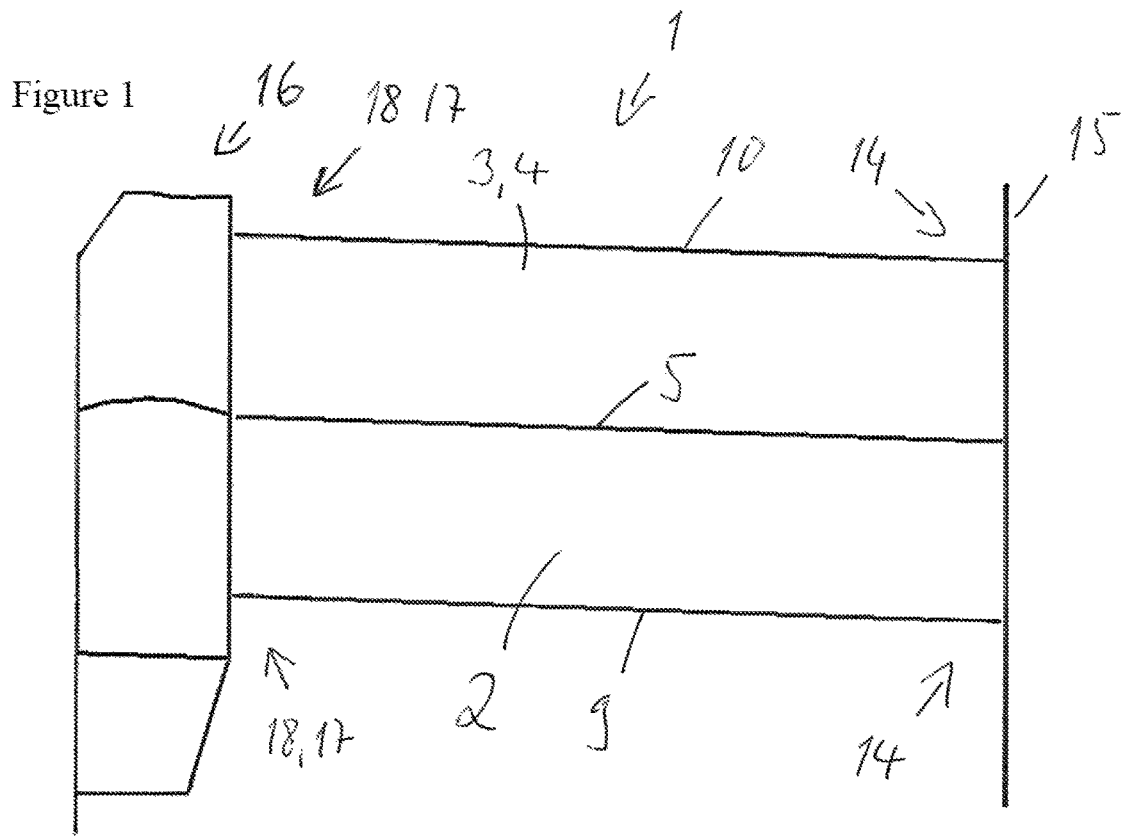
FIG. 1 shows one exemplary embodiment of a crash box according to the invention with a crossmember and connecting flange arranged thereon, in a sectional illustration parallel to the longitudinal extent of the crossmember.

FIG. 1 shows one exemplary embodiment of a crash box according to the invention in a sectional illustration along the longitudinal extent of the crash box 1. Here, a first hollow chamber 2 is arranged below two other hollow chambers 3 and 4. It is of course also possible in another exemplary embodiment (not shown here) to arrange the first hollow chamber above the two other hollow chambers. This depends on the height at which a crossmember is to be arranged on a motor vehicle with a crash box of this type.

Here, a connecting flange 15 is arranged at that one end 14 of the crash box 1 which is directed toward the motor vehicle, with the aid of which connecting flange 15 the crash box 1 can be fastened to a motor vehicle or a longitudinal carrier of a motor vehicle.

A crossmember 16 is fastened in an attaching section 18 to the other end 17 of the crash box 1 which is directed toward the crossmember and lies opposite the end 14 of the crash box 1.

Here, the crash box 1 according to the invention is configured as a multiple chamber hollow profile, three hollow chambers 2, 3 and 4 being provided according to the invention. Here, the lower hollow chamber 2 is separated from two upper hollow chambers 3 and 4 by means of a dividing wall 5 which extends from the one end 17 of the crash box 1, at which the crossmember 16 is arranged, as far as the other end 14 of the crash box 1, at which the connecting flange 15 is arranged.

Here, the hollow chamber 2 of the crash box 1 is formed by a lower outer wall 9 and the dividing wall 5 and therefore likewise extends from the one end 17 of the crash box 1, at which the crossmember 16 is arranged, as far as the other end 14 of the crash box 1, at which the connecting flange 15 is arranged.

In the same way, the upper hollow chambers 3 and 4 extend from the first end 17 as far as the second end 14 of the crash box 1. Here, the upper hollow chambers 3 and 4 are formed by the dividing wall 5 which separates the lower hollow chamber 2 from the upper hollow chambers 3 and 4, and an upper outer wall 10 of the crash box 1 and a dividing wall 8 which separates the upper hollow chambers 3 and 4 and can be gathered, in particular, from the illustration of FIG. 2.

Figure 2:
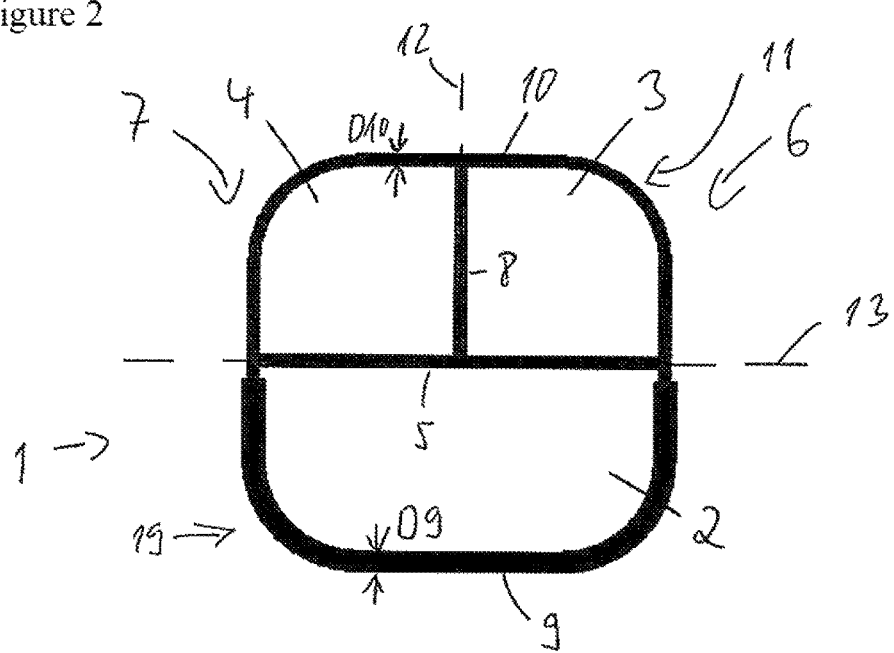
FIG. 2 shows a sectional illustration of the crossmember according to the invention from FIG. 1 perpendicularly with respect to the longitudinal extent of the crossmember.

As can likewise be gathered, in particular, from FIG. 2 which shows a sectional illustration perpendicularly with respect to the longitudinal extent of the crash box 1 according to the invention, the dividing wall 8 which separates the two hollow chambers extends from the dividing wall 5 which separates the lower hollow chamber 2 from the upper hollow chambers 3 and 4 as far as the upper outer wall 10 on an upper side 11 of the crash box according to the invention.

As can also be gathered from FIG. 2, the cross section of the crash box 1 perpendicularly with respect to its longitudinal extent is substantially rectangular, the corners of said rectangle being rounded. Here, the upper hollow chambers 3 and 4 are arranged mirror-symmetrically with respect to one another, a center axis 12 of the dividing wall 8 which separates the upper hollow chambers 3 and 4 forming a corresponding mirror axis.

Furthermore, the lower hollow chamber 2 is also configured mirror-symmetrically with respect to the two upper hollow chambers 3 and 4, with the exception of the dividing wall 8 which separates the upper hollow chambers 3 and 4. Here, the mirror axis there is formed by a center axis of the dividing wall 5 which separates the upper hollow chambers 3 and 4 from the lower hollow chamber 2.

It can be seen in the cross section of the crash box 1 which is shown in FIG. 2 that the crash box 1 is formed by an upper side 11 and an underside 19 and by an inner side 6 and an outer side 7.

Here, the lower outer wall 9 which forms the lower hollow chamber 2 together with the dividing wall 5 which separates the lower hollow chamber 2 from the upper hollow chambers 3 and 4 extends approximately from the center of the outer side 7 of the crash box 1 at the level of the dividing wall 5 over the underside 19 of the crash box 1 until it ends approximately centrally on the inner side 6 of the crash box 1 at the level of the dividing wall 5.

In an analogous way, the upper outer wall 10 which forms the upper hollow chambers 3 and 4 together with the dividing walls 5 and 8 extends from approximately the center of the outer side 7 of the crash box 1 over the upper side 11 of the crash box 1 as far as approximately centrally on the inner side 6 of the crash box 1, where it ends again at the level of the dividing wall 5. Here, the outer walls 9 and 10 merge into one another or are connected directly to one another.

As can be gathered from FIG. 2, furthermore, the outer wall 9 of the lower hollow chamber 2 of the crash box 1 is of considerably thicker configuration here than the outer wall 10 of the crash box 1 and the dividing walls 5 and 8. In the case of a configuration of the crash box as an extruded profile made from metal, it has been proven here that the thickness D9 of the lower outer wall 9 of the crash box is approximately from 1.5 to 2.5 times, in particular twice as thick, as the thickness D10 of the upper outer wall 10 of the crash box 1 or the dividing walls 5 and 8. As a result, the dividing walls 5 and 8 have approximately the same thickness as the upper outer wall 10 of the crash box 1. In one exemplary embodiment of the crash box, the thickness of the lower outer wall 9 can be approximately 4 mm here in the case of a configuration of the crash box 1 from a lightweight metal, in particular from aluminum or an aluminum alloy, whereas the thickness of the remaining walls (the outer wall 10 of the crash box and the two dividing walls 5 and 8) is approximately 2 mm. The configuration of the walls with different thicknesses leads to the crash box 1 deforming correspondingly in the case of a crash and the desired crease formation occurring, a rotation of the crossmember which is connected to the crash box 1 being minimized. Here, the input of energy is compensated for substantially by the crash box 1, with the result that a motor vehicle which is connected to the crash box is protected significantly as a result against an excessive input of energy.

Figure 3:
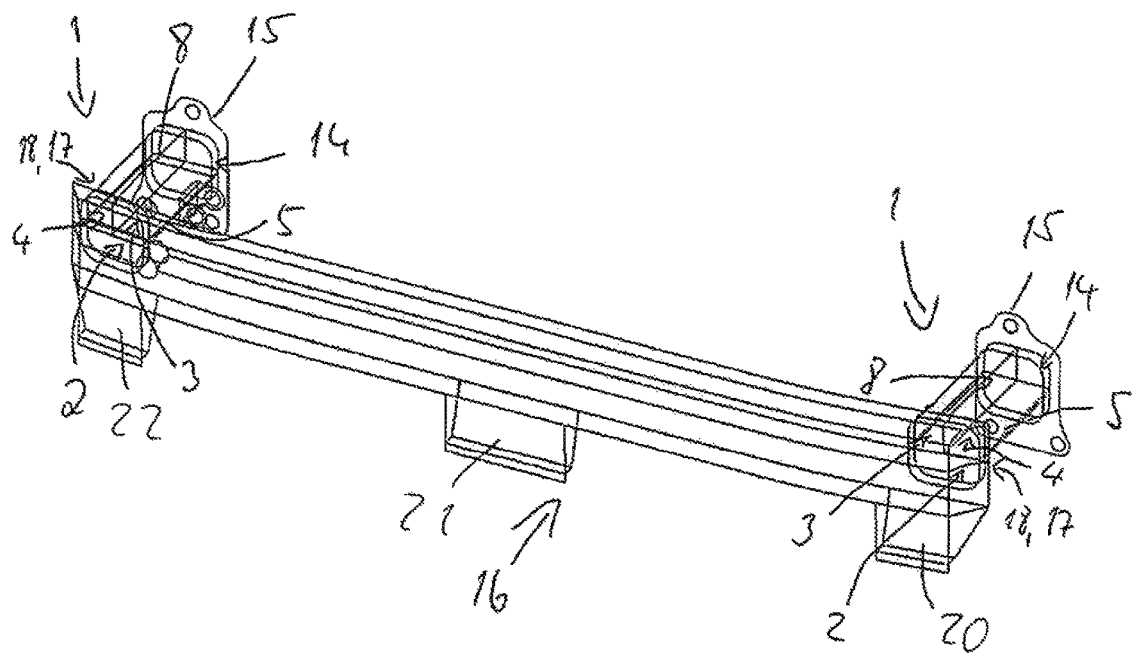
FIG. 3 shows an energy absorption structure according to the invention for a motor vehicle having two crash boxes according to the invention in a perspective view.

FIG. 3 then shows an energy absorption structure for a motor vehicle having a crossmember 16, on the outer regions of which in each case one crash box 1 according to FIGS. 1 and 2 is arranged, in a perspective illustration.

Here, the crash boxes 1 are connected via an attaching region 18 at an end 17 of the crash box 1 to the crossmember 16. It can also clearly be seen in said illustration that two identical crash boxes can be used, with the result that different components do not have to be produced for a left-hand and a right-hand crash box. Here, the upper hollow chamber 4 of the crash boxes 1 forms an outer upper hollow chamber, whereas the hollow chamber 3 of the crash boxes 1 forms an inner upper hollow chamber.

Furthermore, in each case one connecting flange 15 is arranged at the other end 14 of the crash boxes 1. It is then possible by means of the connecting flanges 15 to arrange the energy absorption structure according to the invention for a motor vehicle on precisely a motor vehicle of this type or a longitudinal carrier of a motor vehicle of this type.

As can be gathered from FIG. 3, furthermore, the crossmember 16 has bumper barriers 20, 21 and 22 which are offset downward in terms of height and via which a load input into the energy absorption structure takes place if, in the case of a crash, the crossmember does not itself strike an obstacle, but rather strikes it only by way of the bumper barriers 20, 21 and 22. In particular, this also ensures that a load input takes place into the energy absorption structure if the motor vehicle does not strike an object by way of the crossmember 16, but rather the respective obstacle lies lower than the crossmember 16. In this case, the load input to the energy absorption structure of the motor vehicle is ensured via the bumper barriers 20, 21 and 22.

Figure 4:
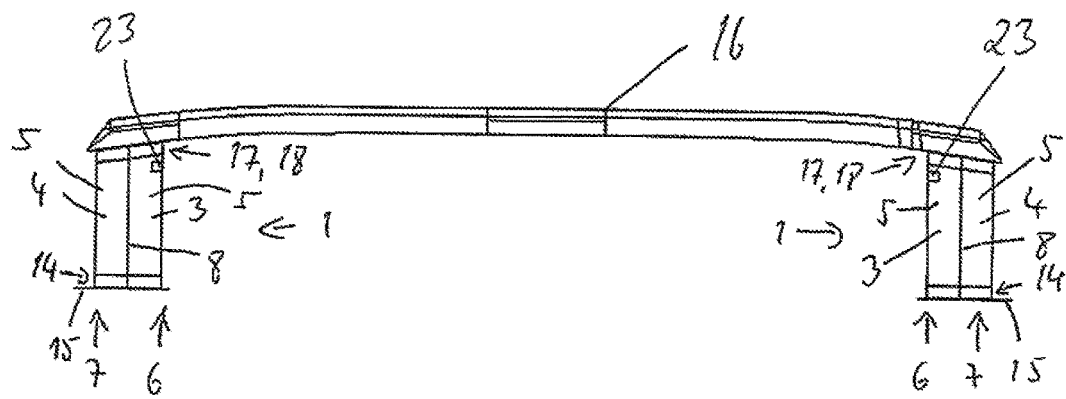
FIG. 4 shows the energy absorption structure from FIG. 3 in a plan view.

FIG. 4 shows the energy absorption structure from FIG. 3 once again in a plan view, the sectional plane running through the two dividing walls 5 of the crash boxes 1 which separate the lower hollow chambers 2 of the crash boxes 1 from the upper hollow chambers 3 and 4 of the crash boxes 1. It can also be seen clearly in said illustration that the crossmember 16 of the energy absorption structure, on which the crash boxes 1 are arranged, is scarcely curved itself. By virtue of the fact that the crossmember 16 is scarcely curved, it can itself barely make a contribution to the dissipation of load in the case of a crash. To this extent, the entire dissipation of load is achieved substantially by way of the deformation and energy absorption structure of the crash boxes 1, there being a corresponding deformation with minimized rotation of the crossmember about its longitudinal axis by way of the configuration according to the invention with the upper hollow chambers 3 and 4 and the lower hollow chamber 2.

It can also be seen clearly in the illustration of FIG. 4 that the crash boxes 1 are connected at their one end 17 via an attaching region 18 to the crossmember 16. At their other ends 14, they are connected to a flange 15, by way of which the energy absorption structure can be arranged on a motor vehicle or a longitudinal carrier of a motor vehicle.

Furthermore, it can be seen clearly in said illustration that the upper hollow chambers 3 and 4 are separated from one another by a dividing wall 8. Here, the upper hollow chambers 4 are arranged on an outer side 7 of the respective crash box 1 and the upper hollow chambers 3 are arranged on an inner side 6 of the respective crash box 1. The upper hollow chambers 4 therefore form outwardly directed hollow chambers of the crash box 1 which point away from the vehicle center longitudinal axis, and the upper hollow chambers 3 form inwardly directed hollow chambers of the crash box 1 which point toward the vehicle center longitudinal axis.

The lower hollow chambers 2 of the crash box 1 cannot be seen in the illustration of FIG. 4, since the view is directly of the dividing walls 5 which separate the upper hollow chambers 3 and 4 from the lower hollow chamber 2.

LIST OF DESIGNATIONS

1 Crash box
2 Hollow chamber
3 Hollow chamber
4 Hollow chamber
5 Dividing wall
6 Inner side
7 Outer side
8 Dividing wall
9 Outer wall
10 Outer wall
11 Upper side
12 Center axis
13 Center axis
14 End
15 Connecting flange
16 Crossmember
17 End
18 Attaching section
19 Underside
20 Bumper barrier
21 Bumper barrier
22 Bumper barrier
23 Recess

What is claimed is:

1. A crash box having a plurality of hollow chambers which extend over the longitudinal extent of the crash box, a first hollow chamber being arranged offset in terms of height with respect to a second hollow chamber and a third hollow chamber in the mounted position, wherein the first hollow chamber is separated by means of a dividing wall from the second and third hollow chambers which are arranged above or below the first hollow chamber, and the first hollow chamber extends from an inner side to an outer side of the crash box.

2. The crash box as claimed in claim 1, wherein the dividing wall is of continuous configuration and connects the inner side to the outer side of the crash box.

3. The crash box as claimed in claim 1, wherein the two hollow chambers which are configured offset in terms of height with respect to the first hollow chamber are separated from one another by means of a further dividing wall, the dividing further wall preferably being of continuous configuration and connecting the dividing wall which separates the first hollow chamber from the two hollow chambers which are configured offset in terms of height with respect to the first hollow chamber to a boundary wall, preferably an upper side of the crash box.

4. The crash box as claimed in claim 1, wherein the cross section of the crash box is of substantially rectangular configuration perpendicularly with respect to its longitudinal extent.

5. The crash box as claimed in claim 1, wherein, in the cross section of the crash box, the two hollow chambers which are configured offset in terms of height with respect to the first hollow chamber are arranged substantially mirror-symmetrically with respect to one another, a center axis of the dividing wall which separates the two hollow chambers which are configured offset in terms of height with respect to the first hollow chamber being configured as a mirror axis.

6. The crash box as claimed in claim 1, wherein an outer wall of the first hollow chamber has a thickness which is greater than the thickness of the outer wall of the two hollow chambers which are configured offset in terms of height with respect to the first hollow chamber, and/or the thickness of the dividing walls, the thickness of the outer wall of the first hollow chamber preferably lying between 3 mm and 5 mm, and the thickness of the outer wall of the two hollow chambers which are configured offset in terms of height with respect to the first hollow chamber and the thickness of the dividing walls preferably lying between 1.5 mm and 2.5 mm.

7. The crash box as claimed in claim 1, wherein a connecting flange can be arranged at the one end of the crash box in order to arrange the crash box on a motor vehicle or a longitudinal carrier of a motor vehicle.

8. The crash box as claimed in claim 1, wherein it is triggered by way of at least one preferably hole-shaped recess, preferably in at least one corner of the end regions.

9. The crash box as claimed in claim 1, wherein it is formed from aluminum or aluminum alloy, in particular is configured as an extruded profile, and preferably has a yield strength which lies between 50 MPa and 200 MPa.

10. An energy absorption structure for a motor vehicle having a crossmember, on the outer regions of which in each case one crash box as claimed in claim 1 is arranged.

11. The energy absorption structure as claimed in claim 10, wherein the crossmember projects at least in sections with at least one bumper barrier beyond the crash box in a manner which is offset in terms of height.

12. A motor vehicle comprising:
at least one energy absorption structure having a crossmember, wherein at least two crash boxes are connected to the crossmember, wherein the crash boxes each include a plurality of hollow chambers which extend over the longitudinal extent of the crash box, a first hollow chamber being arranged offset in terms of height with respect to a second hollow chamber and a third hollow chamber in the mounted position, wherein the first hollow chamber is separated by means of a dividing wall from the second and third hollow chambers which are arranged above or below the first hollow chamber, and a width of the first hollow chamber is distinct from a width of the second hollow chamber and is distinct from a width of the third hollow chamber.

13. The crash box as claimed in claim 1, wherein a width of the first hollow chamber from the inner side to the outer side of the crash box is distinct from a width of the second hollow chamber and is distinct from a width of the third hollow chamber.

14. The crash box as claimed in claim 1, further comprising:
- an outer wall having a length extending between a first end and a second end, the outer wall having a width extending between the inner side and the opposing outer side;
- wherein the first hollow chamber is at least partially defined by the outer wall, the first hollow chamber having a width extending from the inner side to the outer side;
- wherein the second hollow chamber is at least partially defined by the outer wall, the second hollow chamber having a width that is distinct from the width of the first hollow chamber;
- wherein the third hollow chamber is at least partially defined by the outer wall, the third hollow chamber having a width that is distinct from the width of the first hollow chamber; and
- wherein the dividing wall extends between the inner side and the outer side, wherein the dividing wall at least partially defines the first hollow chamber, at least partially defines the second hollow chamber, and at least partially defines the third hollow chamber.

15. The crash box of claim 14, further comprising:
- a second dividing wall extending between the dividing wall and the outer wall, wherein the second dividing wall at least partially defines the second hollow chamber and at least partially defines the third hollow chamber.

16. The crash box of claim 14, wherein, in a cross section of the crash box, the first hollow chamber is arranged substantially mirror-symmetrically with respect to the second and third hollow chambers about a plane extending through the dividing wall.

17. The crash box of claim 16, wherein, in the cross section of the crash box, the second hollow chamber is arranged substantially mirror-symmetrically with respect to the third hollow chamber about a plane extending through the second dividing wall.

* * * * *